(12) United States Patent
Sharma et al.

(10) Patent No.: US 8,744,196 B2
(45) Date of Patent: Jun. 3, 2014

(54) AUTOMATIC RECOGNITION OF IMAGES

(75) Inventors: Avinash Sharma, Karnataka (IN);
Serene Banerjee, Karnataka (IN);
Anjaneyulu Seetha Rama Kuchibhotla, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 513 days.

(21) Appl. No.: 12/987,179

(22) Filed: Jan. 10, 2011

(65) Prior Publication Data

US 2012/0134576 A1 May 31, 2012

(30) Foreign Application Priority Data

Nov. 26, 2010 (IN) .............................. 3568/CHE/2010

(51) Int. Cl.
*G06K 9/00* (2006.01)
*G06F 17/30* (2006.01)
*G06K 9/46* (2006.01)

(52) U.S. Cl.
CPC ............ *G06F 17/30247* (2013.01); *G06K 9/46* (2013.01)
USPC .......................................................... 382/224

(58) Field of Classification Search
USPC ................ 382/181, 100; 707/104.1
See application file for complete search history.

(56) References Cited

U.S. PATENT DOCUMENTS

| | | | |
|---|---|---|---|
| 5,668,897 A * | 9/1997 | Stolfo ............................ | 382/283 |
| 6,327,388 B1 | 12/2001 | Zhou et al. | |
| 2004/0203970 A1 | 10/2004 | Rooke et al. | |
| 2005/0226261 A1 * | 10/2005 | Varadarajan et al. .......... | 370/412 |
| 2008/0089591 A1 * | 4/2008 | Zhou et al. ..................... | 382/224 |
| 2009/0252383 A1 * | 10/2009 | Adam et al. .................... | 382/118 |
| 2009/0300101 A1 | 12/2009 | Freer | |
| 2010/0008265 A1 | 1/2010 | Freer | |
| 2010/0073398 A1 | 3/2010 | Fisher et al. | |

FOREIGN PATENT DOCUMENTS

| | | |
|---|---|---|
| WO | WO2009069840 A1 | 6/2009 |
| WO | WO2009134482 A2 | 11/2009 |

OTHER PUBLICATIONS

Guangyu Zhu et al., "Logo Matching for Document Image Retrieval," University of Maryland, College Park, MD 20742, USA, entire document, 2010.

Jan Neumann et al., "Integration of Local and Global Shape Analysis for Logo Classification," Proceedings of the 4th International Workshop on Visual Form (IWVF4), Lecture Notes in Computer Science 2059, Springer, Berlin, 2001, pp. 769-778.

Brijesh Pillai, "Shape Descriptor using Polar Plot for Shape Recognition," 5 pages, 2007.

(Continued)

*Primary Examiner* — Hadi Akhavannik

(57) ABSTRACT

Presented is a method of automatically performing an action, based on graphical input. The method comprises: receiving, for a user, an input image; comparing the input image with the contents of a user-customized database comprising a plurality of records, each record representing a predefined class of image, wherein the user has previously associated records in the database with respective specified actions; attempting to recognize the image, based on the similarity of the input image to one of the predefined classes of image represented in the user-customized database; and if the image is recognized, performing the action previously associated by the user with the class. Also presented is apparatus for recognizing an image and a method of constructing a user-customized database.

20 Claims, 6 Drawing Sheets

(56) References Cited

OTHER PUBLICATIONS

Guangyu Zhu et al., "Automatic Document Logo Detection," Institute for Advanced Computer Studies University of Maryland, College Park, MD 20742, USA, entire document, 2007.
Serge Belongie, Jitendra Malik, Jan Puzicha, "Shape Matching and Object Recognition Using Shape Contexts," IEEE Transactions on Pattern Analysis and Machine Intelligence, Apr. 2002, pp. 509-522, vol. 24 No. 24.
Song Cao, Jijie Zhao, "Object Purpose Based Grasping," 5 pages, 2010.
Li Fei-Fei, Rob Fergus, Pietro Perona, "One-Shot Learning of Object Categories," IEEE Transactions on Pattern Analysis and Machine Intelligence, April 2006, pp. 594-611, vol. 28, No. 4.
"IETE Technical Review," May-Jun. 2008, pp. 47, vol. 25, No. 3.
R. Marin, J. S. Sanchez, P. J. Sanz, "Object Recognition and Incremental Learning Algorithms for a Web-based Telerobotic System," Proceedings of the 2002 IEEE International conference on Robotics and automation, Washington DC May 2002, pp. 2719-2724.

* cited by examiner

AUTOMATIC RECOGNITION OF IMAGES

RELATED APPLICATION

Benefit is claimed under 35 U.S.C. 119(a)-(d) to Foreign application Serial No. 3568/CHE/2010, filed in INDIA entitled "AUTOMATIC RECOGNITION OF IMAGES" by Hewlett-Packard Development Company, L.P., filed on Nov. 26, 2010, which is herein incorporated in its entirety by reference for all purposes.

BACKGROUND

Various algorithms have been proposed for automatically analyzing or recognizing the contents of images, such as objects or symbols. Among the different algorithms, one category is characterized by the extraction of fiducial points from the image. Fiducial points (or fiduciary points) are locations in the image exhibiting significant structure. Also known as "feature points", "key-points" or "significant points", they are typically chosen by finding small neighbourhoods in which the two-dimensional colour or intensity function of the image undergoes a significant variation of some kind. The fiducial point can then be chosen as the centre of this local neighbourhood. Different types of image variation may be suitable for selecting fiduciary points. For example, they could be extracted based on analysis of the directional gradients of the image intensity, or they could be extracted based on a centre-surround filter function, which detects spatial variations in intensity in an isotropic fashion.

Once a set of fiducial points or key-points has been extracted, their mutual configuration can be used to generate a compact description of the content of an image (or a portion of an image). Such a description of image content is often referred to as a feature vector. Feature vectors can be used to compare arbitrary images, or to identify the unknown content of a test image, by comparing its feature vector with the exemplary feature vectors of a number of classes. In this case, the exemplars are known as reference vectors or training vectors. A variety of pattern classification techniques can be used to try to enhance the efficiency or accuracy of recognition using the feature vectors.

Since they are to be used for characterizing or recognizing image contents, it is desirable that the key-points extracted from the image are distinctive, yet insensitive to common confounding factors such as brightness or contrast changes; and changes in the viewing geometry. This is to enable robust recognition of the same contents (e.g. objects) in different images, acquired under different conditions.

Separately, it has been proposed to associate each symbol in a library of symbols with a network address of a network service. If a captured representation of a symbol matches a symbol in the library, the network address associated with the symbol is used to access the network-based service.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Figure 1:
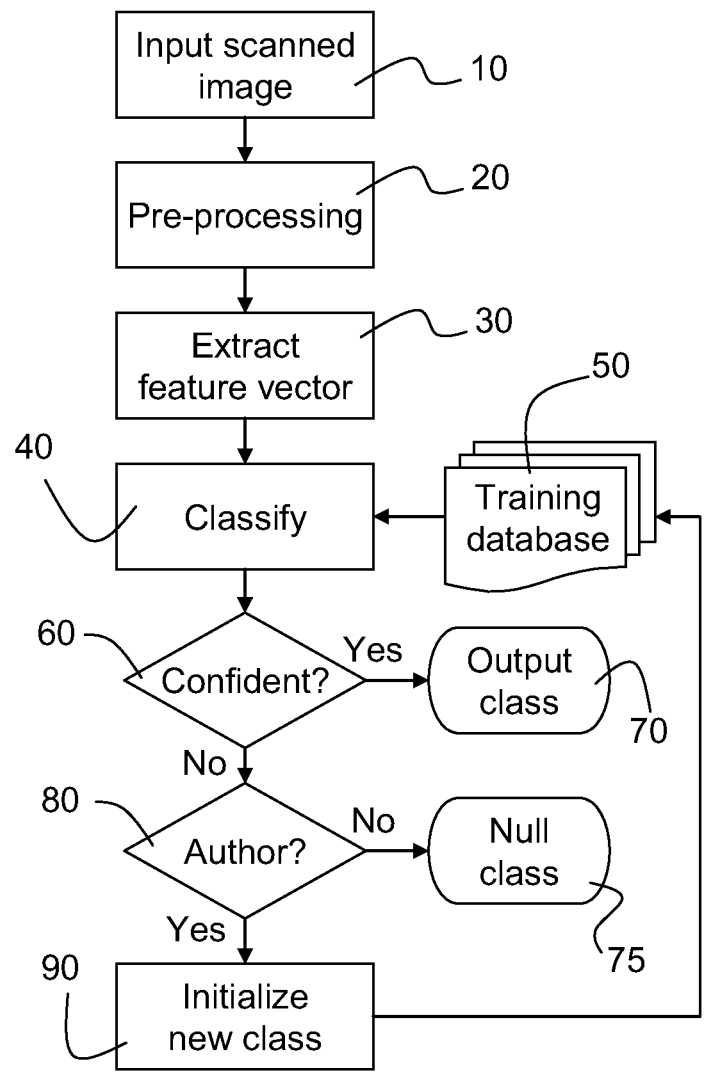
FIG. 1 is a flowchart showing a method of classifying image contents using fiducial points, according to an embodiment.

FIG. 1 gives an overview of a method according to an embodiment. In this method, an input image is received in step 10 from a scanner. The image is pre-processed in step 20 to convert it to a suitable form for feature extraction. The type of pre-processing will depend on the type of input image and the application for which the image is to be used. Those skilled in the art will appreciate that pre-processing is optional—for example, the image may already have been prepared in a form that is suitable for direct input to the image recognition system. In the present embodiment, the goal is to recognize an artifact such as a symbol; logo; trade mark; or signature in the input image. Such a graphical artifact will also be referred to in general in this description as a symbol. The symbols of interest in this embodiment are not machine-readable codes such as bar codes or two-dimensional matrix codes. Rather they are human-readable graphical (two-dimensional) symbols such as logos, printed on a document.

An example application of this is in recognizing distinguishing graphical marks on a scanned document image. The marks to be recognized have characteristic two-dimensional shapes, which can be described based on feature points extracted from the image.

According to the present embodiment, the pre-processing comprises smoothing of the image using a Gaussian filter; followed by median filtering to remove any salt-and-pepper noise. Each input image is also deskewed in order to improve the robustness of the system to distortions due to rotation of the document image. Next, the scanned image is binarized, so that the foreground is black and the background is white. Those skilled in the art will be familiar with conventional image processing methods suitable for performing this pre-processing.

Next the binary image is segmented, to localize the artifacts (for example, symbols) to be recognized. The output of the segmentation is one or more windows, each of which is intended to contain an artifact to be recognized subsequently. A variety of segmentation algorithms exist which may be suitable for this purpose. For example, the segmentation may rely on the detection of connected foreground components in the binarized document image. Alternatively, a method such as recursive X-Y cut could be used to decompose the image into a set of rectangular blocks containing foreground components.

In the following, the detection or segmentation of graphic symbols according to an embodiment will be described.

The artifacts generally dealt with in real world include logos, signatures, specific symbols etc. Each of these artifacts varies in characteristics and properties. The position of the artifacts in the image can be detected and localized. A top to bottom detection approach is used for artifacts in a document.

Figure 10:
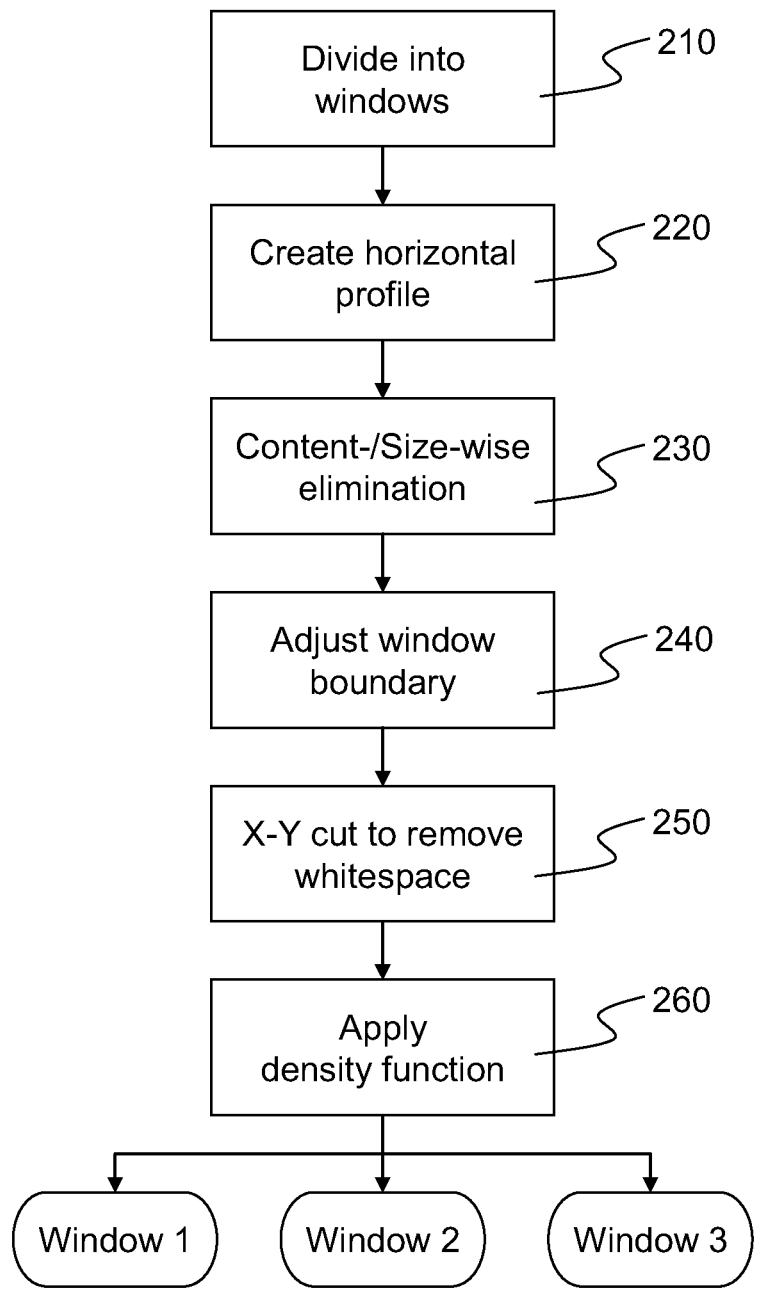
FIG. 10 is a flowchart illustrating a segmentation method, according to one embodiment.

The method focuses on localizing the position of the artifact on the whole document and does not require prior training. The flow diagram of the process for the case of logo detection is shown in FIG. 10. The entire block can be described in sequential order as follows:

a) Divide 210 the binary image into non-overlapping windows ($w_i, i=\{1, 2, \ldots \text{Number of Windows}\}$) of size equal to 5% of the entire document size (this is an approximation of the size of the artifacts of interest, and can be changed if needed). The value of 5% is determined empirically and this value does not affect the results, provided it is of a similar order to the artifact size. It can be changed if needed. Let the horizontal and vertical dimensions of the each window, i, be $h_i$ and $v_i$, respectively.

b) For each window, determine 220 the horizontal profile. The horizontal profile is defined as the sum of all foreground pixels in a row, plotted against the row number. Compute the peak value $P_i$ in each of the windows. Also, for each window, compute $Z_i$ as the maximum of the differences in the position of all the two consecutive transitions between background (zero values) and foreground (positive integer values); the bottom of the window and the first transition; and the last transition and the top of the window. That is, $Z_i$ is the maximum distance between consecutive transitions from foreground to background or background to foreground.

c) Elimination 230—
   a. Content-wise elimination: Eliminate all the windows for which:

$$P_i < f_1 h_i$$

This step eliminates all windows which are either mostly white or contain noisy scan dots or very little text. The right hand side of the inequality is a fraction $f_1$ of the horizontal dimension of the windows. The value of $f_1$ was experimentally determined to be 15% (this value can also be changed or adaptively determined in other embodiments).
   b. Size wise elimination: Eliminate all the windows for which $$Z_i < f_2 v_i$$

$Z_i$ gives the height of the longest continuous foreground in the window. If this value is greater than a fraction $f_2$ of the height of the window, then we retain the window; otherwise, we discard it. If we assume that any artifact is not greater than 5% of the entire document size then one of the windows will at least capture half of the artifact height. Choosing a value of 30% (this is adjustable) for $f_2$ will make the height of the longest continuous foreground in the retained window to be 1.5% of the height of the entire document. These values have been found to effectively reject all the small text and noisy windows, while simultaneously preserving all the likely candidates in the retained window.

d) For each of the windows check 240 the boundary pixels (the column or row at the edge of the window) one side at a time. If boundaries contain foreground pixel(s), we expand the corresponding side by one pixel until all the four boundaries of the window contain only background pixels. This is immediately followed by contraction in the same manner. This processing reflects the fact that artifacts on a document are generally isolated from the rest of the documents by at least one pixel. The main reason behind this idea is to precisely capture the artifact with no extra regions.

e) Remove similar windows and windows which are too small or too large. Perform a Gaussian blurring of each of the windows in such a way that it merges the closer objects and letters of a word but keep the distant objects and different words separated. Implement an X-Y cut 250 on the windows to remove any huge white spaces in them and collect the final set of windows for ultimate selection.

f) Normalize the size of the final set. These windows will contain all the artifacts that are present in the document which satisfy the above rules along with some false windows. Each artifact has its own characteristics. Depending upon the type of artifact desired we employ a function 260 on these final windows to extract the correct windows and reject the rest. As an implemented example for logos, we apply a measure of compactness of the pixels by weighting the black pixels in the window with an exponential function. Since logos are regions with high density of pixels, we observe that the top-3 windows contain the logos. It has been found experimentally that increasing the number of windows beyond 3 will not improve the detection accuracy significantly; however, reducing below 3 can significantly degrade performance Note that the feature generation and classification processes, to be described below, are robust to variations in the detected windows produced by the segmentation process. The precise method of segmentation is therefore not critical to the performance of the subsequent processing. Indeed, in some embodiments and applications, segmentation will not be necessary (for example, because the document image can be assumed to contain a single symbol, or can be considered for recognition as a whole). Likewise, in some embodiments and applications, manual segmentation may be appropriate. For example, a user may select one or more windows to be processed by drawing a bounding box on the input document image.

Hereinafter, the feature extraction and classification algorithms will be described with reference to "test images" and "reference images". However, as those skilled in the art will by now understand, these test and reference images may, in some embodiments, be sub-images generated by segmenting an input document image, while in other embodiments they will be whole document images. The recognition algorithms are not dependent on the size or shape of the input windows and can accommodate either segmented images or whole images.

In the present embodiment, it is assumed that the segmentation algorithm detects three candidate windows for recognition. These may contain three different artifacts, or one or more of the candidate windows may be "false positives"—that is, windows which do not contain any artifact of interest. Such false positives will simply be classified to the null class. In other words, they will be recognized as not belonging to any predefined class of artifact.

The next stage is the identification of the contents of the (segmented) images. The inputs are the three windows (as discussed above) as test images. The output is the classification of each of the three windows, either as belonging to one of the classes represented in a training database 50 or as being an Out-of-Database Member (ODM).

In step 30, a feature vector describing the test image is extracted. In step 40, the feature vector is classified, with reference to the contents of the training database 50.

Training Database: The training database 50 consists of user-authored artifacts categorized into various class-buckets depending upon their similarity. We assume that we have a total of N training samples spanned over K classes in the beginning. It is to be noted though that the database is dynamic and the user can add artifacts to the database whenever required.

ODM: If the method is not able to identify any of the K classes then the image is considered as an out-of-database member (ODM).

The feature extraction 30 and classification 40 algorithms will be described in greater detail below. The classification algorithm permits the evaluation of a confidence measure in the classification result. This confidence measure is checked in step 60. If it is above a given threshold, the assigned class is output 70. If the confidence is below a given threshold, it is deduced that the test image is an ODM. In this case, the user is asked 80 whether it is desired to author a new class in the database, based on the test image. If this is desired, the method proceeds to initialize 90 a new class, which will be added to the training database 50. If it is not desired to author a new class, the result 75 of the classification is that the test image belongs to the null class.

Preferably, the training database includes an action associated with each class of artifact. When a test image is classified as belonging to that class, the action is implemented. For example, an action may comprise launching a pre-defined software application associated with the class: if a user shows a railway ticket to the system, it would automatically identify it as belonging to the class "railway ticket" and invoke the website of the railway operator.

A method 30 of extracting a feature vector will now be described in greater detail, with reference to FIG. 2.

The method comprises detecting 32 a set of feature-points. Each point is characterized by its location in the image. Together, the set of points describes the salient characteristics of the image contents.

Figure 3:
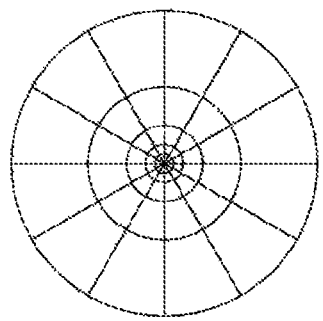
FIG. 3 shows the spatial layout of histogram bins for generating a feature vector according to an embodiment.

The feature-points are used in two different ways to construct feature vectors. Each feature-vector consists of a two-dimensional spatial histogram of the feature-points. The feature vectors vary by the manner in which the histogram is constructed. The histogram bins have a log-polar structure. FIG. 3 shows the spatial layout of the bins for a log-polar polar histogram, according to the present embodiment. In this example, there are 5 bins in the radial direction, partitioned in a logarithmic fashion. There are 12 bins in the angular dimension, so that each bin comprises a sector of an annulus, having a constant angular width of 30° and logarithmically varying radial thickness.

To generate a first feature vector, the centroid of the set of feature points is found in step 34. The centroid can be defined as the mean of the coordinates of the feature-points. In step 36, a log-polar histogram is constructed by placing the origin (centre) of the log-polar structure of FIG. 3 at the centroid of the feature points. The size of the window is rescaled to a fixed height and width. The aspect ratio of the original segmented window may therefore be changed. The training images also undergo the same scaling to the same predetermined dimensions; therefore, the method is invariant to changes in the aspect ratio of the images. The histogram is then populated by counting the number of feature points which fall into each of the log-polar bins.

Other feature vectors can be generated in a similar manner, by placing the origin of the log-polar histogram at each one of the individual feature points, in turn. This step 38 generates a set of feature-vectors. The number of these feature vectors is equal to the number of feature-points detected in step 32.

As will be explained in greater detail below, the single feature-vector generated by step 36 (with the histogram centred on the centroid) can be used to support a fast initial classification. The set of multiple feature vectors output from step 38 can be used to support an optional, more complex, but potentially more accurate classification—for example, if the initial fast classification yields low confidence in the resulting class-label.

If the number of concentric circles used in the log-polar histogram structure is R and the number of sectors used to divide the entire structure is S, then the structure has R·S bins. To generate the feature-vector, the histogram bin-values are concatenated, to obtain a column vector of length m=R·S. The concatenation is done in such a way that the indices of the column vector follow the pattern $\{(1.1,2.1, \ldots R.1), (1.2,2.2, \ldots R.2), \ldots, (1.S,2.S, \ldots R.S)\}$. That is, the bins are traversed in a radial-first pattern. A matrix A is created such that each of the columns of the matrix is a vector obtained from one of the training images. So, what we obtain finally is a matrix $A \epsilon^{m \times N}$. Similarly we obtain a column vector $y \epsilon^m$ for each of the test images.

As noted above, the method 30 of extracting a feature vector depends in part upon the detection of feature-points in step 32. A method 32 of detecting feature-points, suitable for use in the feature extraction method 30, will now be described in greater detail, with reference to FIG. 4.

This method tries to extract the most interesting and informative points in an image, while simultaneously eliminating redundant points and the outliers. The algorithm does not require the number of significant points to be pre-defined, since it decides the appropriate number based on a qualitative criterion. This enables it to adapt appropriately, depending upon the type of image at hand. Global knowledge of the shape of the edge contours is exploited. Objects in images are associated with various shapes. Edge contours best provide this information. This global property is combined with a local property at pixel level to obtain a useful set of informative data points.

The method assumes that wherever two edges intersect with an angle between them in a predefined interval, a possible significant point exists. The information about the number of edges passing through a pixel is derived from the number of sign changes in the difference between the image function and its local mean. Also, care is taken to discard false candidates, including points close to straight lines and also those which are closer to another significant point than a predefined threshold. In addition, the method finally prunes candidate points by accepting only those which lie in the vicinity of an edge.

Figure 4:
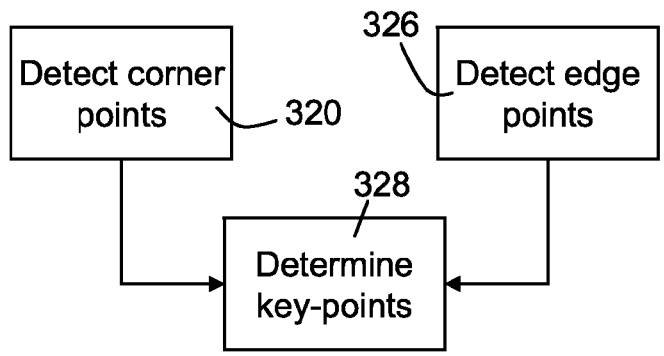
FIG. 4 illustrates a method of detecting feature-points according to an embodiment.

As shown in FIG. 4, the method 32 comprises detecting 320 corners; detecting 326 edges; and combining these detected sets of points to determine 328 a set of feature-points.

In step 326, given an image I of size N×N, edge points in I are determined using an edge detection technique. The Sobel operator has been used for edge detection for experiments with the present embodiment. However, other edge detectors such as the Canny Edge Detector could equally be used. As noted above, binary images are used in the present embodiment. For such images more simplified edge detectors could be considered. However, since the extraction algorithm is equally applicable to gray-scale images, it is preferred to use the Sobel operator (or Canny operator) to maintain generality. In general, the edge contours produced by the edge detection method are wider than one pixel. The contours are refined, by eliminating some of the candidate edge-pixels to reduce the width of the contours. This is done by a thinning operation to reduce the contour width to a single pixel.

The thinning operation is performed as follows. Once the edge strengths and direction are determined at each pixel, a measure of likelihood of being an edge (LBE) is calculated at each pixel as follows. A 3×1 window is placed over each pixel, along the gradient direction. For each pixel a measure, 'm', is defined as the number of times the mid-pixel is a maximum of the three pixels in the 3×1 window, and a measure, 'v', is defined as the number of times a pixel is visited by the 3×1 window. The measure LBE is then (m/v). Hence, LBE can range from 0 to 1. If LBE=0, and if LBE=1, then the edge pixel is retained. However, for 0<LBE<1, the decision whether the pixel would be retained or not is determined from the LBEs of the neighborhood pixels as follows. For natural images the edges are continuous and are perpendicular to the direction of the gradient. So, at each pixel where LBE=1, the LBEs of the left, right and upper neighbors are considered, and the contour is proceeded along the direction of the maximum of the LBEs of these neighbors.

The one pixel wide contour points are collected in a set E in which each element is represented by its spatial location.

Figure 5:
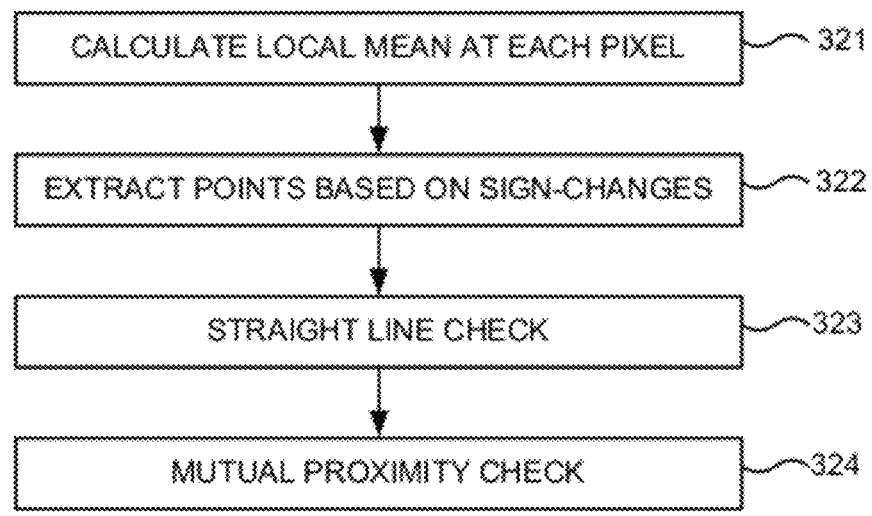
FIG. 5 is a flowchart showing a method of detecting corner points in an image, in greater detail.

The method 320 of detecting corner points in the method of FIG. 4 will now be described in greater detail, with reference to FIG. 5.

In an embodiment the step of detecting corner points comprises, at each of a plurality of first points in the image: calculating a representative value of the image in the vicinity of the first point; calculating, for each of a sequence of second points circumscribing the first point, a difference between the value of the image at the second point and the representative value; and counting the number of sign changes in the sequence of differences.

The following set of parameters is used in an exemplary method:

M: Radius of the neighborhood for the mean value computation.

r: Radius of the neighborhood for computing sign changes (may be equal to or different from M).

t: The minimum allowed distance between two significant points.

s: The minimum allowed distance between a Special Point (SP) candidate and a straight line.

$d_s$: The maximum allowed curvature divergence for straight line candidates.

$d_a$: Determines the angular range in which the angle between SP candidate's edges should lie.

The local mean values of I at each pixel location (i,j) are determined using the following formula:

$$g(i, j) = \frac{1}{\pi M^2} \sum_{\Omega_{i,j,M}} I(k, l)$$

For each location (i,j), the number of sign changes is counted in the sequence generated by subtracting the image values at the circumference of a circle of radius r centered at the location from the local mean value g(i,j). If there are exactly two sign changes, the angular positions of these sign changes are noted and the angle formed between these two positions of sign change is calculated. This is the angle formed between a line from the centre pixel to the first position and a line from the centre pixel to the second position. If the angle lies in the interval $|\alpha_{i,j}-\pi/2|<d_a$, the corresponding pixel is considered as a corner point. That is, corner points are detected as points which belong to two edges, wherein the angle between the two edges falls in a predefined range about a right-angle. These points are collected in a set C. From C, all those points which are closer to a straight line by a distance s and closer to each other by a distance less than t are eliminated. Here a pixel (i,j) is said to lie on a straight line if the number of sign changes (found in the way described above) is two and the angle lies in the interval $|\alpha_{i,j}-\pi|<d_s$. In other words, points lying on a straight line are detected as points which belong to two edges, wherein the angle between the two edges falls in a predefined range about 180°. The filtered set of points is collected in a set D with each element in the set described by its spatial coordinates.

The key-points are determined 328 from the set D and the set E as follows. At each point in E, a circular neighborhood of a radius r' is defined. This may be equal to r or suitably chosen to some other appropriate value. A search is then performed for points from D which lie within the defined circular neighborhood. The points found are collected in a set W, while discarding the rest of the points. This produces the desired set of significant points from I.

Figure 6:
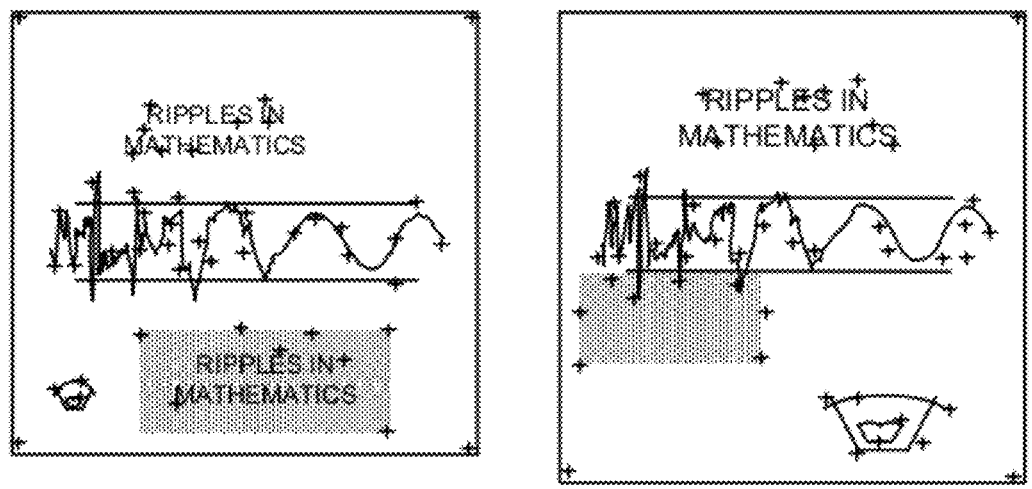
FIG. 6 shows examples of the feature-points detected in images according to an embodiment.
Figure 6:
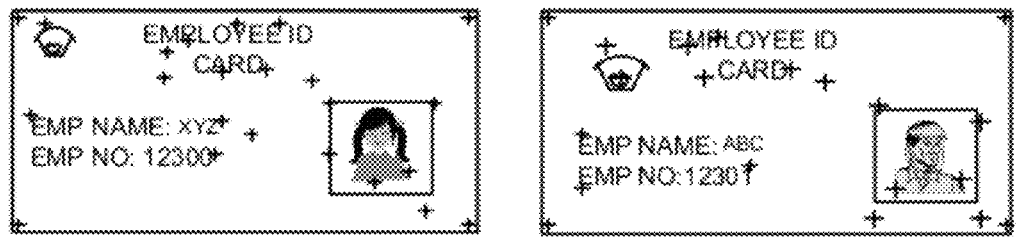

The obtained set of points is located at corners of the paragraphs, tables, and also at locations which can be used for shape identification. FIG. 6 shows examples of several images with the feature points extracted according to the present embodiment indicated by "+" symbols.

This algorithm has several advantages:
a) It can fulfill dual functions: document layout capture; and shape information capture.
b) It is robust to noise, illumination changes, scaling and rotation, and also typical print-scan variations.
c) It does not require manual input of the number of feature-points required; the algorithm decides implicitly, on its own, depending upon the contents of each given image.
d) It works well for low contrast images where the state of the art algorithms, such as the Scale-Invariant Feature Transform (SIFT), perform poorly.
e) It typically extracts far fewer points than other methods in the literature and still gives better performance.

Figure 7:
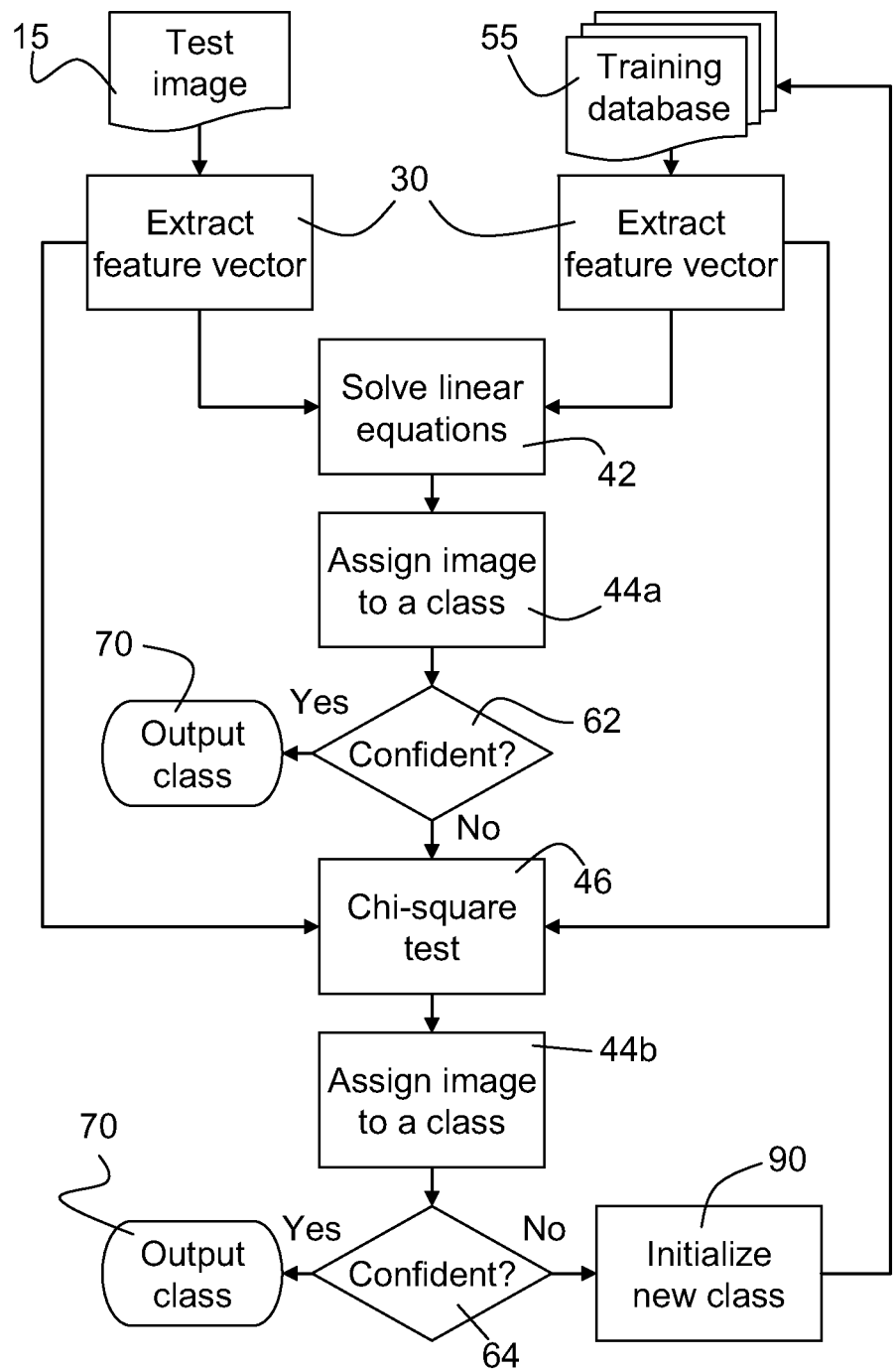
FIG. 7 illustrates a method of classifying image contents according to an embodiment, in greater detail.

FIG. 7 illustrates a method of classifying a test image, according to an embodiment. Note that the embodiment of FIG. 7 is structured slightly differently to the embodiment of FIG. 1, although the underlying method is the same. In FIG. 1, the training database 50 is assumed to store feature vectors extracted previously from training images. In FIG. 7, the training database is assumed to store training images. To facilitate a clearer description, the extraction of feature vectors 30 is shown explicitly in FIG. 7. Those skilled in the art will appreciate that the classification method will otherwise operate identically for these two embodiments.

Feature vectors are extracted 30 from a test image 15 to be classified and a set of training images in the training database 55. The feature-vector extraction procedure has already been described above.

A two stage classification strategy is used, in order to provide highly accurate classification as well as accurate ODM detection so that user authoring and outlier rejection is efficient:
a) In the first stage 42, 44a, which is faster and more accurate, the classifier assumes that the feature vector extracted from a valid artifact (that is, one that belongs to one of the known classes) can be expressed as a sparse linear combination of the entire set of N training images. An $l_1$ minimization problem can be solved for the sparse reconstruction of the test sample.
b) If the first stage is not confident of the class, the classifier proceeds to the second stage 46, 44b, in which each image is expressed as a matrix of feature descriptors and a nearest neighbor match is performed to identify the class of the test image. This method is computationally more complex; however, experiments show that it is relatively rare for a test sample to need to proceed to the second stage. The effect is a saving in computational effort, which may be an important benefit when the method is implemented in devices with limited computational capability, such as mobile devices.

The first stage 42 comprises solving a set of linear equations. Let us assume that the test image belongs to the $i^{th}$ class with training samples $A_i=\{A_i^1, A_i^2, \ldots A_i^{N_i}\}$. We express the vector obtain from the test image y as a linear combination of vectors obtained from all the training samples in the database and an error vector:

$$y=Ax+e$$

The coefficient vector X will have non-zero entries only in its corresponding class positions, i.e.

$$x=[0,0\ldots,x_i^1,x_i^2,\ldots,x_i^{N_i},\ldots,0,0]$$

Here, e is the error column vector. Error e can be split into two parts:

A Sparse Error ($e_1$): This component represents the noise resulting from spurious feature-points. These may be caused by image components other than the foreground regions containing the desired artifact. Under-segmentation of an input image can cause this type of error, because a given window may contain a desired artifact as well as some additional, unwanted components. It could also be caused by visible interference, such as occlusion of the artifact, or ink blots on the document. The number of bins to which this error will contribute is typically far less than the total number of bins, because the area affected by this type of noise is relatively small, so we denote $e_1$ the sparse error.

A Small Error ($e_2$): This component relates to the small error present in the non-zero bins of Y due to some extra or smaller number of points extracted in the corresponding bins. This error may be caused, for example, by the remaining sensitivity of the feature-point detection algorithm to variations in the imaging conditions.

The entire equation can now be written as:

$$y=Ax+e_1+e_2$$

Assuming $e_1$ to be sparse and magnitude of $e_2$ to be smaller than a small positive number $\epsilon$, the above problem is solved in following steps:

a. A is a m×N matrix. Normalize each column of A to have a unit $l_2$ norm. Similarly normalize Y to have unit $l_2$ norm.
b. In order to estimate $e_1$ solve $$x' = \min_x \|y - Ax\|_1$$

That is, find the vector of weights x' which, when used to linearly combine the training feature-vectors, yields the smallest difference, according to the L1 norm. Using x', reconstruct the original test vector as y'=Ax'. An estimate of $e_1$ can be obtained by subtracting the approximation from the test feature-vector: $\hat{e}_1=y-y'$. An exemplary optimization strategy, for solving the minimization mentioned, will be described in greater detail later, below.

c. Using the reconstructed approximation y' as the new test vector with no sparse error and x' as the starting coefficients solve $$x''=\min\|x''\|_1 \text{ subject to } \|e_2\|_2=\|Ax'-y'\|_2 \le \epsilon$$

In other words, find the vector of weights x" which have the smallest L1 norm, subject to the requirement that the magnitude of the small error remains below a preset threshold. The vector x" should presumably be sparse and is used to reconstruct a clean version of the original y and classify it. This second, "clean" reconstruction is an approximation of the test feature vector generated purely as a linear combination of (all of) the training feature vectors. Further details of an exemplary optimization strategy, for solving the minimization mentioned, will be given later below.

d. Vector of weights x" contains information about the class of the test image as well as its validity (that is, the confidence, or likelihood that it is accurate). As mentioned earlier, it should be sparse and concentrate on a single class. We could use a variety of mathematical techniques to test this. For this implementation, we use the Sparsity Concentration Index (SCI), defined in step e, below. Firstly, in order to classify the test image into one of the K classes, we create K characteristic functions $\delta_i(x)$, $i=\{1, 2, \ldots, K\}$, such that the only non-zero entries in $\delta_i(x)$ will be the entries in x" associated with class i. We then compute a residue value for each class as, $$r_i(y'')=\|y''-A\delta_i(x'')\|_2$$

The residue is therefore the difference between the clean reconstructed approximation and an approximation based on the training feature-vectors of just one single class. We can assign 44a the test image to the class which produces the minimum residue:

$$\text{class}(y) = \arg\min_i r_i(y'')$$

e. We use the Sparsity Concentration Index (SCI) formula to compute the sparsity of the obtained vector of weights, x":

$$SCI(x'') = \frac{K \cdot \max_i \|\delta_i(x'')\|_1 / \|x''\|_1 - 1}{K-1} \in [0,1]$$

Ideally we should obtain a value of 1 for a valid test image, but in practical cases this does not happen. We obtain relatively high values for a valid test image and relatively low values for invalid test images. This enables us to define a threshold T1 to distinguish between a valid and a non-valid test image. If the SCI is above this threshold, the test image is deemed to be confidently classified 62. In this case, the assigned class label is output 70. If the SCI is below the threshold, the algorithm is deemed not to be confident in the result, and the method proceeds to the second stage 46 of classification, where the assignment to a class will be reevaluated.

Note that although the steps d. and e. are efficient techniques to extract information from the coefficients, other formulae could also be used here, as an alternative, or in addition.

Two minimization steps were used in the foregoing classification method. The optimization algorithms used in the present embodiment to perform the minimization will now be described in greater detail.

Each class is represented by a small library of feature vectors. Thus, only the Library φ needs to be stored for classification, which would be of size M×L, where M is the size of the feature-vector, and L is the total Library size. The classification proceeds as follows:

Inputs:
K—Truncation parameter
N—Number of classes
φ—Library (previously denoted as A above)
D—Given image which is to be identified Initialization:
y—Feature-vector obtained from given data D. The feature-vector is generated as previously described above.

The classification algorithm is initialized by computing $T^0$, $T_i^0$, "best" initial class $C^0$, and the initial residue $y_r^0$:
$T^0$—Indices of the K largest values of abs(φ*y).
$T_i^0$—Indices in $T^0$ corresponding to class i.
Best class $$C^0 = \underset{i}{\operatorname{argmax}} \|\Phi_{T_i^0} x_i^s\|_2,$$

$x_i^s = \Phi_{T_i^0}^+ y$, where $\Phi^+$ is the pseudo-inverse defined as $\Phi^+ = (\Phi^*\Phi)^{-1}\Phi^*$ Initialize residue $$y_r^0 = y - \Phi_{T_{C^0}^0} x_{C^0}^s$$

Iteration:
Those Library feature-vectors $\phi_j$ which are the closest to the current residue $y_r^{l-1}$, are identified. This can be done using simple vector dot-products, or any other suitable correlation metric. At each iteration, the selected Library feature-vectors are first combined with the feature-vectors from the previous iteration ($T_{C^{l-1}}^{l-1}$) to form a temporary list of feature-vectors ($\tilde{T}^l$):

1. $\tilde{T}^l = T_{C^{l-1}}^{l-1} \cup \{K \text{ largest indices of abs}(\phi^* y_r^{l-1})\}$ This temporary list is then truncated to retain only the K best indices to form ($T^l$), where K is a suitable truncation parameter:

2. $T^l$ = indices of the K largest values in abs($\tilde{x}_p = \Phi_{\tilde{T}^l}^+ y$)

The intuition here is that only those feature-vectors which best reconstruct y need to be retained. Our reconstruction follows the minimum mean-square error (MMSE) approach using the pseudo-inverse—any other suitable reconstruction could also be used here.

Next, among these identified feature-vectors in $T^l$, only those that belong to a particular class are considered, and a residue metric is thus computed for each class:

3. $T_i^l$—Indices of class i in $T^l$
4.

$$C^l = \underset{i}{\operatorname{argmax}} \|\Phi_{T_i^l} x_i^s\|_2,$$

$x_i^s = \Phi_{T_i^l}^+ y$, $sc^l(i) = \|\Phi_{T_i^l} x_i^s\|_2$

5. Compute $$y_r^l = y - \Phi_{T_{C^l}^l} x_{C^l}^s$$

Again, any suitable residue metric can be used for this purpose—this implementation uses a pseudo-inverse based residue. The class with the least residue is declared as the "best" class for the current iteration, as a temporary output. In certain applications, the truncation to K entries mentioned may be optional.

Stopping Criteria:
If there is a convergence behavior among the "best" class outputs at successive iterations, then that class is declared as the output:

If $C^l = C^{l-1}$ and $\|y_r^l\|_2 \leq \|y_r^{l-1}\|_2$ and $$\sum_i (sc^l(i) - sc^{l-1}(i)) / \sum_i sc^{l-1}(i) < \tau,$$

then assign it to class $C^l$ and stop. Otherwise go to step 1.

Outlier Rejection:
Between iterations and before outputting a classification result, the given data is checked to determine if it is an outlier (that is, it does not belong to any existing class):

If $$\max_i sc^l(i) < \gamma$$

then classify as an outlier. Otherwise output class $C^l$.

This is one possible threshold-based rejection—several other rejection rules are also possible, including further iterations with higher truncation parameters, for example.

The value of T1 used in the above step 62 helps to reject invalid images with almost perfect accuracy. Nevertheless, some of the valid test-images which are very noisy will also be (wrongly) classified as invalid (ODM). Such images are a relatively small proportion of all test images.

To deal with this problem we invoke a second check which is computationally complex but very efficient. The second classification stage 46 is described as follows and uses a Chi square test (CST):

a. For each of the N training samples, use the extracted set of feature points to generate a shape descriptor matrix, using the method described in step 38 above. That is, a log-polar histogram is created for each of the extracted feature points by positioning the log-polar pattern at that feature point and counting the other feature points. This provides a vector of length m for each point. Stack each of these vectors in a row-wise manner to obtain a matrix $SC\_i \epsilon^{n_i \times m}$ where $n_i$ is the number of feature points in the $i^{th}$ training sample. Similarly, create a matrix $SC\_test \epsilon^{n_{test} \times m}$ for the test image.

b. Normalize each of the rows in SC_i and SC_test to have a unit $l_2$ norm. For each of the N training images, do the following:

For each SC_i, find whether $n_i$ is less than $n_{test}$ or not. If $n_i$ is smaller, then denote SC_i as the query set and SC_test as the searched set (and vice versa). For each row of the query set, find the nearest neighbor in the searched set using the Chi square test (NN_dis_i) and accumulate the distance for each point. Divide the accumulated distance by the number of points in the query set to obtain the average point to point distance dis between a query set and a searched set. Mathematically:

$$NN\_dis\_i(p) = \min_{j} \sum_{q=1}^{m} \frac{[\text{query}(p, q) - \text{searched}(j, q)]^2}{\text{query}(p, q) + \text{searched}(j, q)},$$

$$j = \{1, 2, \ldots n\_\text{searched}\}$$

$$dis = \frac{\sum_{p=1}^{n\_query} NN\_dis\_i(p)}{n\_query}$$

Here, n_searched and n_query are the number of rows in the query and searched respectively.

The value of dis obtained is low for similar images and relatively high for dissimilar images. This enables us to create another threshold T2 which helps in rejecting any image which does not have the minimum point-to-point distance below T2. Therefore, any test image giving a value of dis>T2 is regarded as ODM otherwise its class is obtained 44b from the residue value computed in step d. of the first stage, explained above. In other words, the test image is labeled ODM if the method has low confidence 64 in the class assignment. The assigned class is output 70 if the method has high confidence in the assignment. Note that the values of T1 and T2 can be determined empirically.

Figure 8:
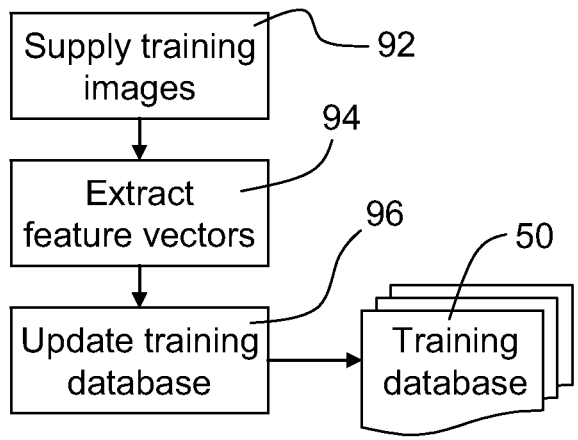
FIG. 8 shows a method for initializing a new class in a training database.

If the test image is ODM, then it may be desirable to add it to the database of test images (or test feature vectors), by initializing 90 a new class. FIG. 8 illustrates in greater detail a method 90 of initializing a new class, suitable for an embodiment.

The system user is given the option of authoring with his desired artifacts. This means that as and when required the user can update the database of the training samples with his new artifact provided he at least supplies one new training sample for the new artifact. The authoring can be done at two points in the system. Either (i) the user is already aware of the database entries and he can add a new artifact which is not present in the database or (ii) once a test image is regarded as ODM, the user may be prompted 80 to add the test image in the database with at least one training sample. This authoring experience adds flexibility to the system. It makes the database dynamic so that it can evolve from an empty database, if necessary, in the beginning to a multiple class database. The user can create his own dictionary according to his needs which can be continuously updated.

Figure 2:
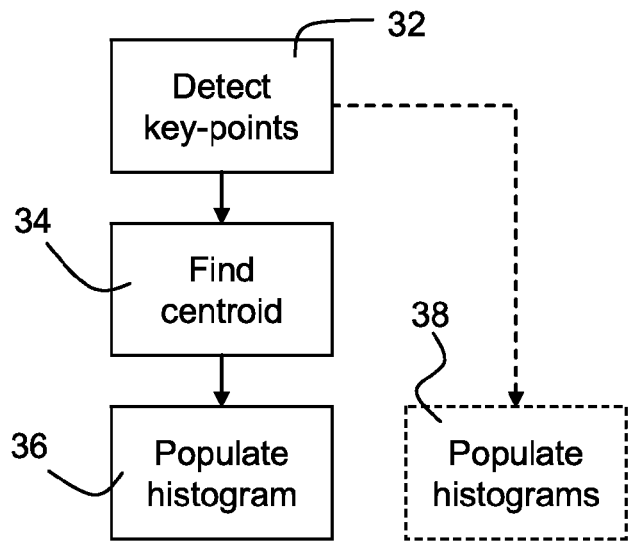
FIG. 2 illustrates a method of extracting a feature vector from an image.

The method of initializing a new class comprises the supply 92 of one or more training images; extraction 94 of feature-vectors from these training images, for example, according to the method 30 of FIG. 2; and update 96 of the training database 50 with the extracted feature vectors.

Figure 9:
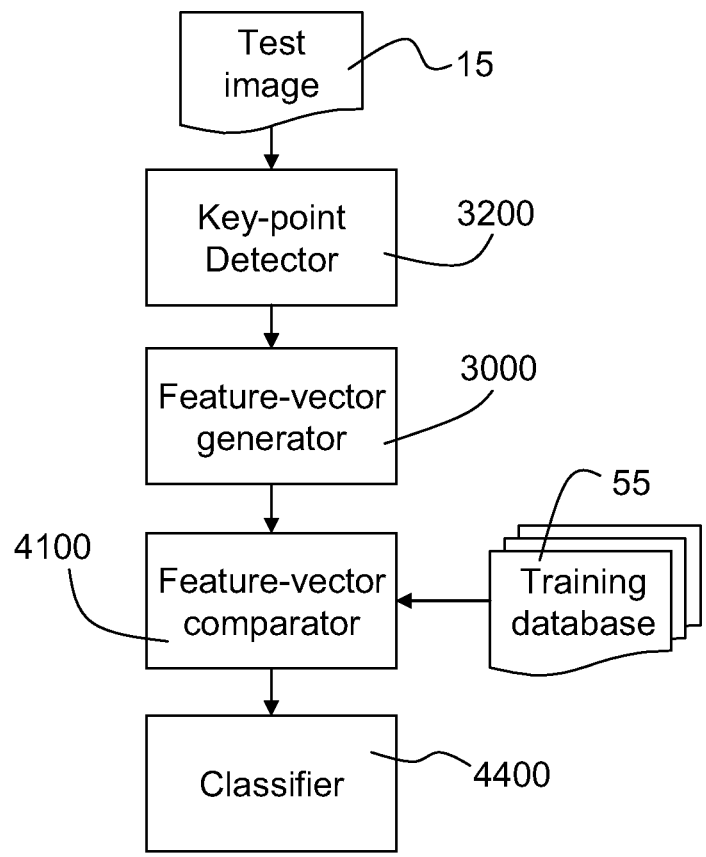
FIG. 9 is a block diagram of an image classification apparatus according to an embodiment.

FIG. 9 shows a block diagram of an image classification apparatus according to an embodiment.

Test image 15 is input to feature-point detector 3200. This is adapted to identify feature-points, according to the method of step 32, described above. The output of feature-point detector 3200 is coupled to the input of feature-vector generator 3000. This is adapted to perform steps 34, 36, 38 of the method of extracting feature vectors 30. That is, feature-vector generator 3000 receives the set of feature-points detected by feature-point detector 3200 and aggregates them in log-polar histograms to produce the feature-vectors. The output of feature-vector generator 3000 is coupled to the input of feature vector comparator 4100. The comparator 4100 is operable to compare the feature-vector(s) extracted from the test image 15 with those earlier extracted from the training images and stored in the training database 55. This compari-son may be based on either or both of: the solution 42 of a set of linear equations; and a chi-square test 46. As explained already above, these two methods are preferably cascaded in series, so that only a limited number of test images need to be processed by the second method in the sequence. The output of the feature-vector comparator 4100 is coupled to input of the classifier 4400. The input data to the classifier 4400 may be the residue y″, resulting from solving 42 the set of linear equations. The output of the classifier may be a class label assigning the test image to one of the known classes, or a null-class label, indicating that the test image does not belong to any of these classes.

As will be apparent to those skilled in the art, the apparatus of FIG. 9 could be realized in a number of ways, in a variety of forms. The choice will typically depend on the specific application of the embodiment. For example, the input image might be captured from a scanner communicating with a computer, such as a desktop personal computer or server. In this case, the computer or server may comprise the apparatus of FIG. 9. The different functional units may be implemented by one or more general purpose processors in the computer—the processor (or processors) having been adapted to this purpose by being suitably programmed. Programming languages and methods for developing such an embodiment will be well known to those skilled in the art.

In other embodiments, the feature extraction and classification may be performed by the same apparatus used to scan the image. In this case, the functional units of FIG. 9 might be implemented as bespoke hardware components, physically adapted to perform the necessary processing.

In still other embodiments, the processing may be performed by a combination of specialised hardware components and software (firmware) controlling the hardware. This might be the case for an implementation in a mobile device, such as a camera-phone, for example.

Naturally, the different functional components may be implemented in a distributed fashion. For example, feature extraction may be performed by a first device; classification may be performed by a second, separate device; and the training database may be stored on a third device (the same as or different from either of the first and second devices). The scope is not limited to any such particular configuration.

Experiments were performed to evaluate the accuracy of the method of the present embodiment, using the Tobacco-800 dataset. This database is a standard collection of documents used for document processing evaluation. We selected 388 documents from the entire database which contained logos (trade marks or similar graphical symbols). Three candidate windows were selected for classification, from each document.

We divide the collection into training and test images. The training set is created by randomly selecting windows containing valid logos and dividing them into different classes depending upon their mutual similarity. In the first experiment we created a training database with 119 training images spanning 12 classes. The number of training images in each class varied from a minimum of 1 to maximum of 15.

In order to normalize the size of training and test images, we resize each image to 256×256 pixels. For the column vector computation before the first stage for classification and the shape descriptors matrix computation, we use the values of R=10, S=24, m=RS=240 for all the training images as well as the test image. We chose value for T1 and T2 to be 0.27 and 25 respectively. These values have been decided empirically, by observing the trends of a few samples. If only the first stage 42, 44a of classification is considered, we obtain nearly 99% classification accuracy for all the valid test images with only 2 false results. None of the invalid test images escaped the first check 62 to give an incorrect classification; however, there were 27 valid test images that needed to proceed to the second stage 46, 44b. Also, if the second stage 46, 44b of classification is run alone then we have 6 valid test images being classified as invalid and 2 invalid test images being classified as valid. For the overall system the accuracy can be presented as:

Out of 186 valid test images, we obtain 100% precision—that is, no image being wrongly classified as belonging to another class. 5 out 186 test images—that is, 2.70% of the valid test images—are wrongly classified as invalid test images. In other words, the recall rate for valid images is 97.3%.

Out of 76 invalid test images, we obtain 2 invalid test images wrongly classified as valid test images.

Experiments also show that for user authoring, classification performance is excellent with a little as a single example of the artifact used as a training image.

A variety of applications can be considered. The following list is a non-exhaustive sample:

(a) Logo based image interpretation: Image interpretation using computers is an ill-posed problem. However, there are cases, such as movie posters, and similar documents, where a logo can give enough information to identify the image. For example, the identified logos on a movie poster could help a personal electronic device with a camera-function to identify the relevant movie poster; perform a search based on it, and give updated information about the movie. The position of the logo could also help the user learn document templates for enhanced document processing. As the understanding is based on the logos of the image, the understanding can be independent of the language of any text on the document.

(b) Linking printed content to electronic information without using machine readable symbologies: Often it is desired to link printed content to electronic information. In the past, this has been done by having machine printed symbologies such as barcodes or QR codes printed on the page. However, this is not always feasible and also impacts the aesthetics of the page. Instead one could have special symbols that are printed on each page of the book. For example, it could be a book with symbols on each page. The symbols could either be unique or a small set of symbols could be repeated. Alternatively a suitable 2D artifact on the page such as an equation or figure could be linked with information. At the time of authoring, the user (who could be a teacher, for example) could associate this symbol or artifact with online information; and at the time of reading, the reader (who could be a student) could capture an image of the artifact and automatically retrieve the online information.

(c) Voice annotation on paper with user defined symbols: The user could voice annotate a page using their own handwritten symbols. Whenever the page is camera-captured, these handwritten symbols could be recognized as 2D artifacts, and the corresponding voice-memo played back.

(d) Language/numeral translation with each character or number of a language being considered as a logo: Natural language translation is an ill-posed problem. However, often, especially in multilingual countries like India, it is desired to read road signs or bus numbers (for example) that consist of unfamiliar numerals and alphabets. The user can open a book of the language that they need to understand, and take pictures of the alphabets and the numerals, and map out a dictionary so that each of those new characters maps to his known language. With his mobile device, he could then point and take a picture of any bill board or bus route, and each of those characters is posed as a logo detection problem. Once the characters are identified, the translation can be obtained. This feature thus enables user experience of comprehending another language without using any natural language processing. The idea could also be extended to shapes of word images for a limited vocabulary, and there is scope of associating actions to these word or character images.

Methods and apparatus according to embodiments enable one or more users to associate custom actions with graphical symbols and to store these associations in records in a database. Two users may create different associations (that is, associate the same symbol with different actions) and therefore different databases. When a given user submits a test image to be recognized, the contents of that image will be compared with the database for that user. If a symbol in the image is recognized by the system, it may automatically perform the action associated with that symbol by that user.

An action associated with a symbol may be unique to that symbol. For example, a user may choose to associate the trade mark of a train company with a timetable available on that company's website. Another user may associate the same symbol with a ticket-purchasing portal elsewhere on the same website, or on another website. In some embodiments, therefore, the action comprises a network address of a service to be accessed in connection with the symbol.

In another example, the symbol relates to the appearance of a business card. For example, a class of business cards for a particular company could be defined by the company logo and the general layout of a business card. The action associated with this class (symbol) may be to add the image of the business card to a contacts database. Then, each time the user captures an image of one of the company's business cards, it will be automatically added to his/her contacts. In some embodiments, therefore, the action comprises a software program or command to be executed in connection with the symbol.

In other embodiments, the definition of the class may be broader. For example, the class may comprise any document with similar features of general layout. Thus, recognizing an image may comprise recognizing the layout of the document pictured in the image. For example, a class of business cards may share a layout in which a logo is present at one corner and there is some text in the middle of the card. In this way, a single action can be associated with business cards in general, so that the same action is performed for every business card. This can be achieved by supplying the system with training examples of different types of business cards and assigning them all to the same class. In the foregoing description, references to "artifacts" and "symbols" in an image can be taken to include the general layout of a document in the image. In another example, the symbol to be recognized is the general layout of a bill (invoice) from a specific company (which often include logos making them easier to recognize). In this case, the action associated with the bill may be to initiate a payment. In some embodiments, therefore, the action comprises initiation of an e-commerce transaction connected with the symbol.

If a symbol is not recognized by the system, the user can be prompted to ask whether he/she wants to update the database. If the symbol is of a type already represented in the database (that is, the system has failed to detect the known class), then the user can select the correct class manually. The database will then be updated using the input image as a new exemplar (reference image). The same applies if the system makes a mistake, and incorrectly classifies a symbol to another class.

Alternatively, the reason for the failure or misclassification might be that the new input image has a different appearance to the existing reference images for that class. For example, a business card may be double sided, with different layout on each side; likewise, a train company may print tickets with varying appearance. In this case, it may be preferable to update the database by creating a new record—that is, instantiating a new class for the new input image. Essentially, the two different appearances are captured by two different classes associated with the same action.

Multiple symbols can map to one action or one symbol can be associated with multiple actions.

The user can construct the database by supplying training (reference) images and inputting an indication of the action to be associated with the symbol.

Disclosed is a method of identifying in an image fiducial points suitable for object recognition, the method comprising: detecting a first set of points comprising corner points in the image; detecting a second set of points comprising the contours of edges in the image; determining the fiducial points as a subset of the points in the first set which are located near to a point in the second set.

Also disclosed is a method of classifying a test image into one of a plurality of predefined classes, the method comprising: identifying fiducial points in the test image; populating a log-polar spatial histogram with the fiducial points, to generate a test feature vector; receiving, for each class, one or more reference feature vectors, extracted from respective one or more reference images for that class; solving a system of linear equations whereby the test feature vector is modeled as a linear combination of the reference feature vectors; and assigning the test image to a first class according to the solution.

Also disclosed is an apparatus for classifying a test image into one of a plurality of predefined classes, the apparatus comprising: a key-point extractor, adapted to: detect a first set of points comprising corner points in the test image; detect a second set of points comprising the contours of edges in the test image; and determine key-points as a subset of the points in the first set which are located near to a point in the second set; a feature-vector generator, adapted to generate a test feature-vector by populating a log-polar spatial histogram with the key-points; a feature-vector comparator, adapted to: receive, for each class, one or more reference feature-vectors, extracted from respective one or more reference images for that class; and compare the test feature-vector with at least one reference feature-vector from each class; and a classifier, adapted to label the test image as belonging to one of the classes, based on the output of the feature-vector comparator.

While specific embodiments have been described herein for purposes of illustration, various other modifications will be apparent to a person skilled in the art and may be made without departing from the scope of the invention.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of automatically performing an action, based on graphical input, the method comprising:
   receiving, for a user, an input image;
   comparing the input image with the contents of a user-customized database comprising a plurality of records, each record representing a predefined class of image, wherein the user has previously associated records in the database with respective specified actions;
   attempting to recognize the image, based on the similarity of the input image to one of the predefined classes of image represented in the user-customised database; and
   if the image is recognized, performing the action previously associated by the user with the class.

2. The method of claim 1, further comprising:
   if the image is not recognized, prompting the user for an action to be associated with a class to which the image belongs; and
   adding a record for the class to the database, associated with the action.

3. The method of claim 1, further comprising:
   if the image is not recognized, prompting the user to indicate a record in the database to which the image corresponds; and
   updating the database, based on the input image, so that the image is in future associated with the same action as the record indicated by the user.

4. The method of claim 1, wherein the step of comparing the input image with the contents of the user-customized database comprises identifying in the image fiducial points suitable for object recognition, comprising:
   detecting a first set of points comprising corner points in the image;
   detecting a second set of points comprising the contours of edges in the image;
   determining the fiducial points as a subset of the points in the first set which are located near to a point in the second set.

5. The method of claim 4, wherein the step of detecting edge contours comprises:
   detecting the contours as a set of candidate edge-pixels; and
   refining the contours, by eliminating some of the candidate edge-pixels to reduce the width of the contours.

6. The method of claim 4, wherein the step of detecting corner points comprises detecting points which belong to two edges, wherein the angle between the two edges falls in a predefined range about 90 degrees.

7. A method of automatically performing an action, based on graphical input, the method comprising:
   receiving, for a user, an input image;
   comparing the input image with the contents of a user-customized database comprising a plurality of records, each record representing a predefined class of image, wherein records in the database are associated with respective specified actions; and
   attempting to recognize the input image by class, based on the similarity of the input image to one of the predefined classes of image represented in the user-customized database;
   wherein the steps of comparing the input image with the contents of the database and attempting to recognize the image comprise:

classifying the input image into one of a plurality of classes, each class corresponding to one of the records in the database, the classification process comprising:

identifying fiducial points in the input image;

populating a spatial histogram with the fiducial points, to generate a test feature vector;

receiving, for each class, one or more reference feature vectors, extracted from respective one or more reference images for that class;

solving a system of linear equations to produce a solution whereby the test feature vector is modeled as a linear combination of the reference feature vectors; and assigning the input image to a first class according to the solution.

8. The method of claim 7, wherein:

the step of solving a linear system of equations comprises, for each class, approximating the test feature vector by a linear combination of the one or more reference feature vectors in that class; and in the step of assigning the input image to a first class, the input image is assigned to the class yielding the most accurate approximation.

9. The method of claim 7, wherein, in the step of populating the spatial histogram, the origin of the histogram is positioned at a centroid of the fiducial points.

10. The method of claim 7, further comprising calculating a measure of confidence that the input image belongs to the assigned first class, wherein, if the measure of confidence is below a preset threshold, the assignment of the input image to the first class is re-evaluated.

11. The method of claim 10, wherein the re-evaluation of the assignment comprises:

for each of the fiducial points identified in the input image:
selecting that fiducial point; and
populating a spatial histogram with the remaining fiducial points, to generate a test feature vector,
wherein an origin of the histogram is positioned at the selected fiducial point;

receiving, for at least the first class, a reference feature vector for each fiducial point of each reference image in that class;

comparing each of the test feature vectors with each of the reference feature vectors; and assigning the input image to a class according to the result of the comparison.

12. The method of claim 1, further comprising constructing the user-customized database, comprising:

receiving, from a user, an image;

receiving, from the user, an indication of an action to be associated with the image;

creating a record in the database to represent that image; and associating the record with the action.

13. A computer program on a non-transitory computer-readable medium, said program comprising computer program code to control a physical computing device to perform the method of claim 1.

14. Apparatus for recognizing an image, comprising:

an input for receiving an input image to be recognized;

a first database comprising a plurality of records, each record representing a class of image and associating the class with an action;

a comparison unit adapted to compare the input image with the contents of the first database;

a recognition processor to associate the input image with a class of image represented in said first database, based on a similarity between the input image and one of the classes represented in the database; and an output, for providing an indication of the action associated with the class corresponding to the input image.

15. The apparatus of claim 14, further comprising a processor to perform the action associated with the class corresponding to the input image.

16. The apparatus of claim 15, wherein the action comprises the processor launching a specific software application associated with the class corresponding to the input image.

17. The apparatus of claim 14, wherein the action comprises multiple actions.

18. The image of claim 1, wherein attempting to recognize the input image comprises identifying the input image as belonging to one of the predefined classes of image, based on the similarity of the input image to one of the predefined classes of image represented in the user-customised database;

wherein, if the image is recognized, performing the action comprises performing an action previously associated by the user with the corresponding class to which the input image belongs.

19. The method of claim 1, wherein the action comprises launching a specific software application associated by the user with the class to which the input image is recognized as belonging.

20. The method of claim 1, wherein the action comprises multiple actions.

* * * * *